W. C. WEIGHTMAN.
MACHINE FOR MANUFACTURING METAL LATH.
APPLICATION FILED NOV. 11, 1920.
1,412,434.
Patented Apr. 11, 1922.
4 SHEETS—SHEET 3.
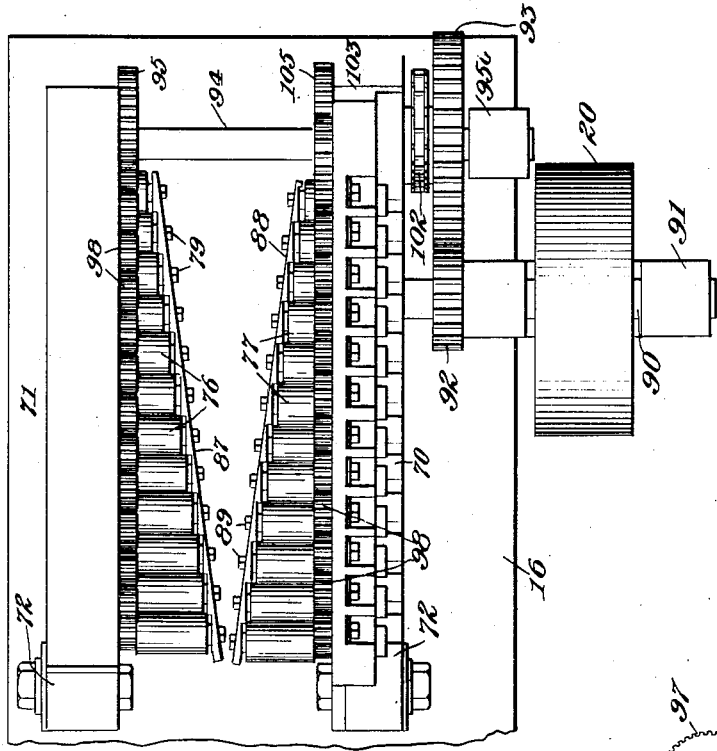
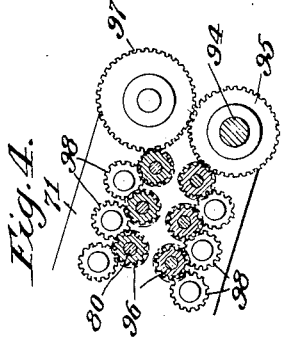
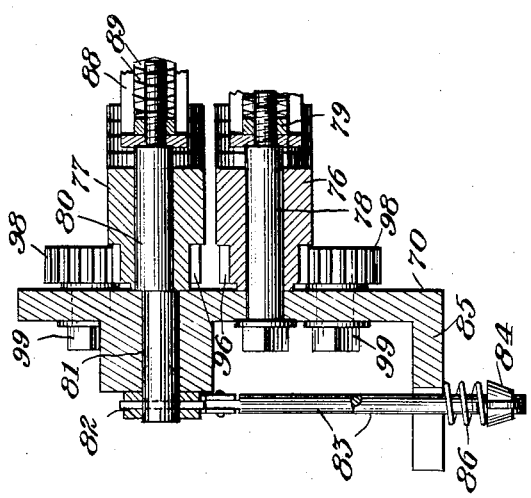
Inventor:
William C. Weightman
By
Att'ys.

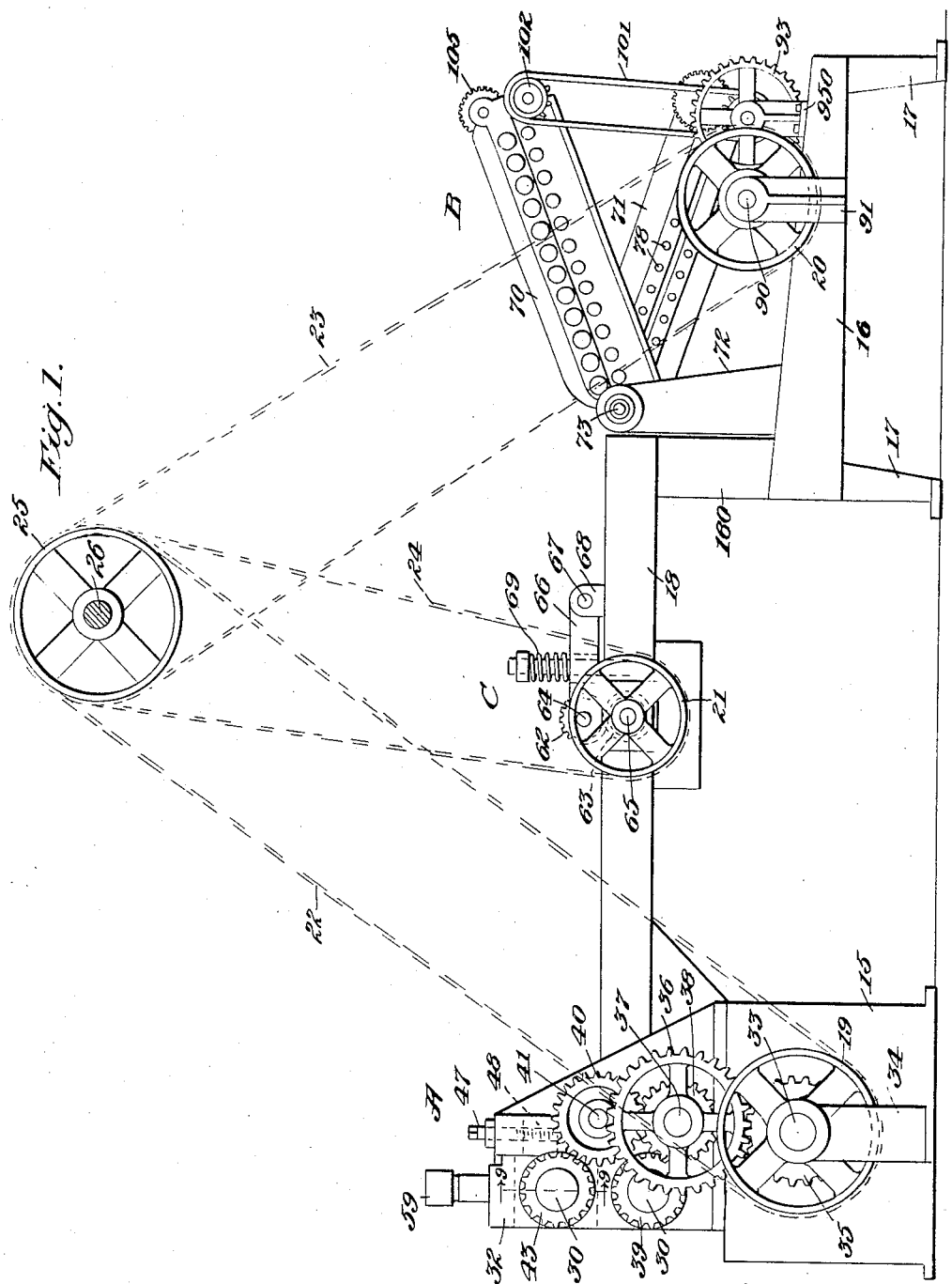

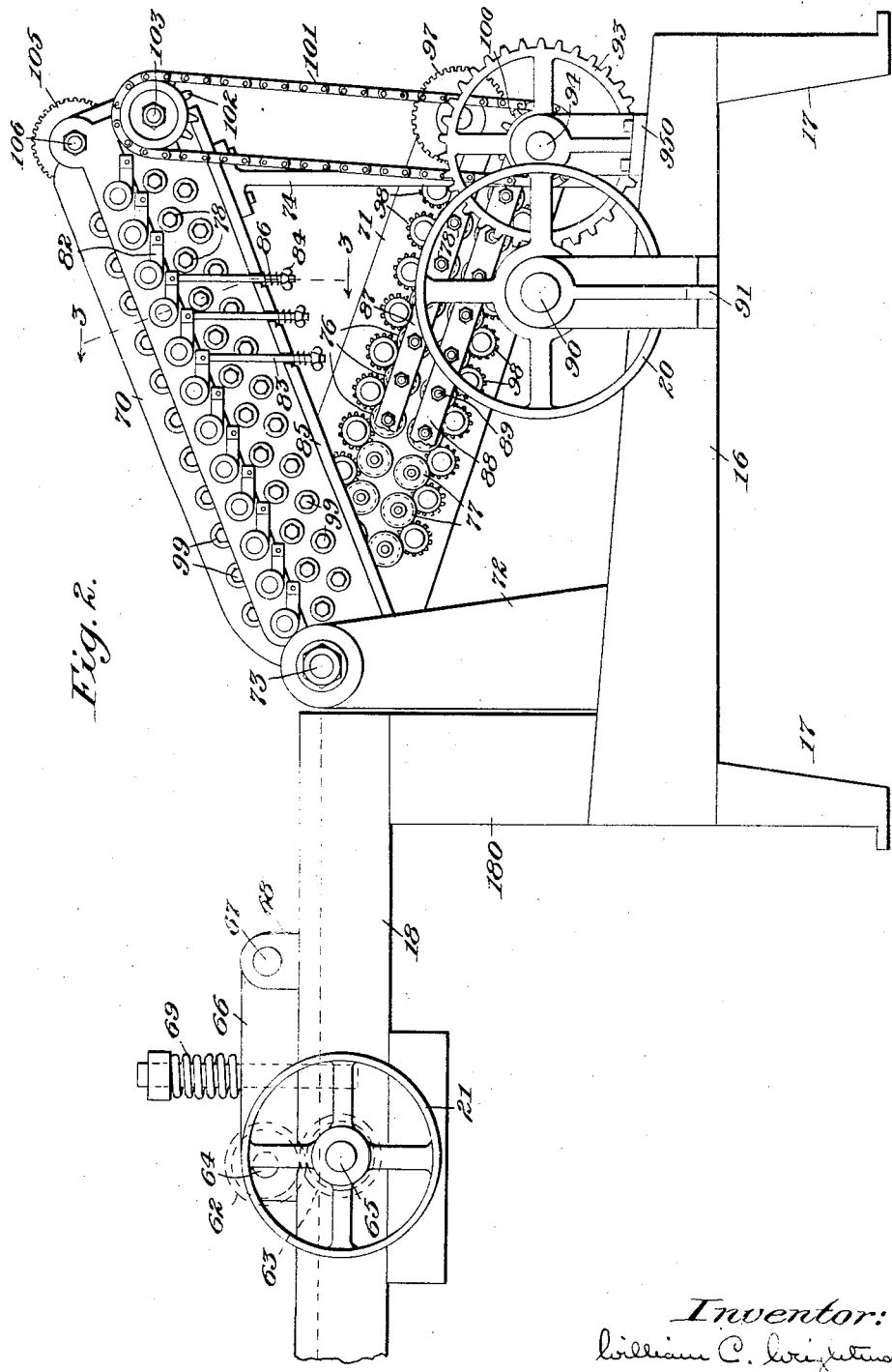

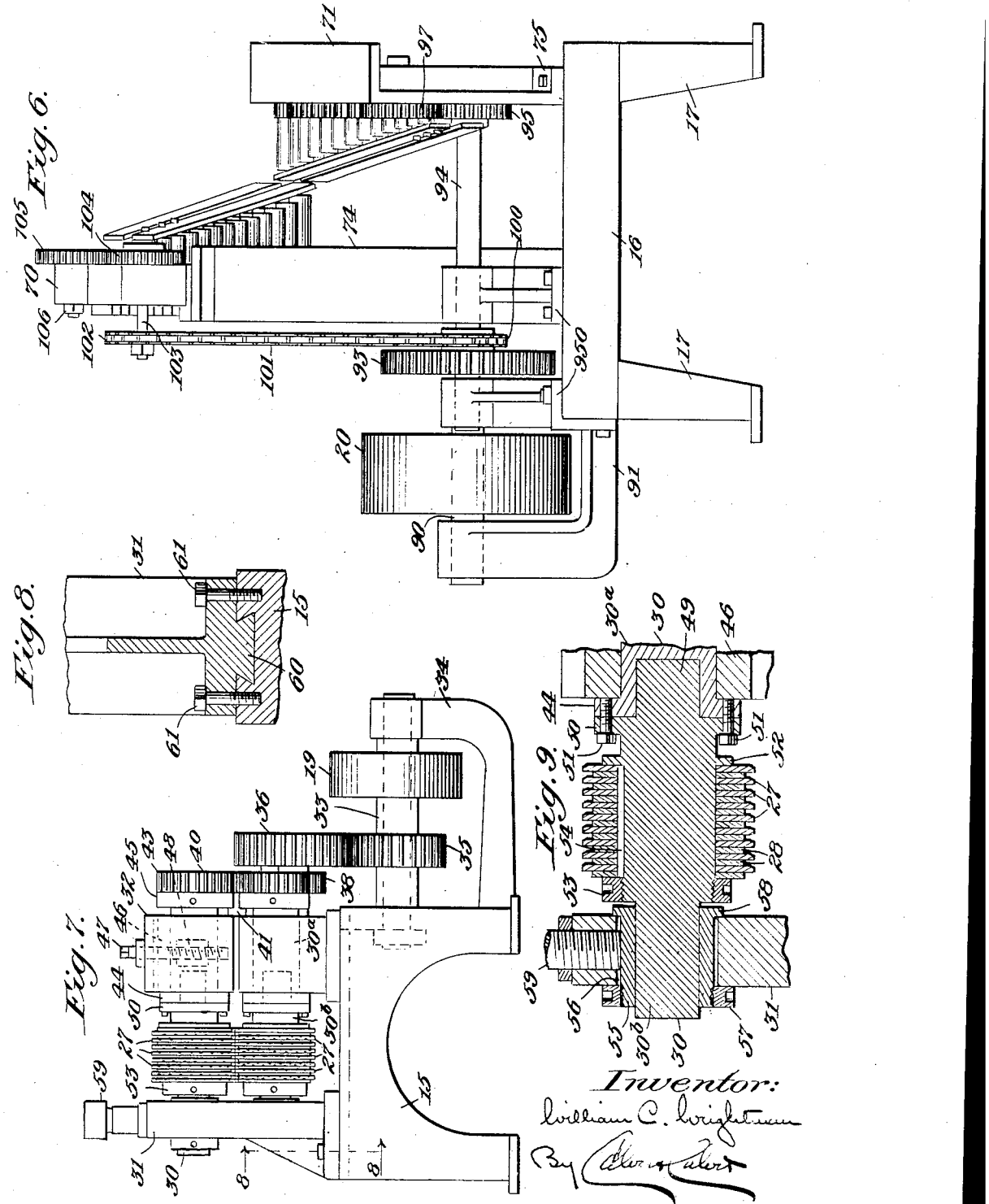

UNITED STATES PATENT OFFICE.

WILLIAM C. WEIGHTMAN, OF GREENSBURG, PENNSYLVANIA, ASSIGNOR TO WEIGHTMAN METAL MANUFACTURING COMPANY, A CORPORATION OF PENNSYLVANIA.

MACHINE FOR MANUFACTURING METAL LATH.

1,412,434.

Specification of Letters Patent. Patented Apr. 11, 1922.

Application filed November 11, 1920. Serial No. 423,280.

*To all whom it may concern:*

Be it known that I, WILLIAM C. WEIGHTMAN, a citizen of the United States, residing at Greensburg, in the county of Westmoreland and State of Pennsylvania, have invented or discovered certain new and useful Improvements in Machines for Manufacturing Metal Lath, of which the following is a specification, reference being had therein to the accompanying drawings.

This invention relates to machines for making expanded metal in accordance with the well-known method of cutting a sheet of metal in such a manner as to form therein a plurality of series of short, alined, longitudinal slits separated by uncut portions or bonds, the slits in each series being staggered with respect to the slits in adjacent series, and thereafter drawing out or expanding the sheet in a direction at an angle to the original plane of the sheet so as to open the slits and cause the strands and bonds to lie at an angle to the plane of the finished sheet.

The invention has for one object the provision of improved cutting or slitting mechanism so arranged as to permit the ready removal and replacement of the cutters for purposes of grinding, adjustment, or otherwise, without necessitating the complete taking down or disassembling of this portion of the machine, as must usually be done in machines of this character as now constructed.

Further objects of the invention are to improve the general organization of the machine and the driving connections therefor as hereinafter more fully set forth.

The foregoing and other objects of the invention, together with means whereby the same may be carried into effect, will best be understood from the following description of one form or embodiment thereof illustrated in the accompanying drawings. It is to be understood, however, that the particular construction shown and described has been chosen for illustrative purposes merely, and that the invention, as defined by the claims hereunto appended, may be otherwise practiced without departing from the spirit and scope thereof.

In said drawings:

Fig. 1 is a somewhat diagrammatic side elevation of the machine as a whole.

Fig. 2 is an enlarged side elevation of the feeding and expanding mechanisms, certain parts being omitted or broken out in order to simplify the illustration.

Fig. 3 is an enlarged detail section taken substantially on the line 3—3, Fig. 2.

Fig. 4 is a detail elevation of the outer end of the lower expander arm and the gearing carried thereby.

Fig. 5 is a plan view of the expanding mechanism.

Fig. 6 is an end elevation of the expanding mechanism looking from the right in Figs. 1, 2 and 5.

Fig. 7 is an end elevation of the cutting or slitting mechanism looking from the left in Fig. 1.

Fig. 8 is an enlarged detail sectional view taken substantially on the line 8—8, Fig. 7.

Fig. 9 is an enlarged sectional view of one of the cutter arbors and associated parts, taken substantially on the line 9—9, Fig. 1.

As shown, the machine frame comprises a standard 15 at the forward end of the machine for supporting the cutting mechanism, designated as a whole in Fig. 1 by the letter A, a platform 16 suitably supported by legs 17 at the rear of the machine for supporting the expanding mechanism, designated as a whole in Fig. 1 by the letter B, and a table 18 supported at its front and rear ends respectively by the standard 15 and by uprights 180 rising from the platform 16, said table carrying the feeding mechanism, designated as a whole in Fig. 1 by the letter C, for advancing the slitted sheet from the cutting mechanism to the expanding mechanism. Power is applied to the cutting mechanism A, expanding mechanism B, and feeding mechanism C through pulleys 19, 20 and 21 respectively, said pulleys being connected by belts 22, 23 and 24 with pulleys 25 on a common countershaft 26 driven from any suitable source of power. In this connection it will be seen that the several mechanisms may be driven in accurate synchronism without the use of complicated interconnecting driving devices, thereby materially simplifying the machine as a whole, and rendering any part thereof readily accessible for purposes of repair or otherwise with a minimum amount of disassembling.

The cutters, per se, as herein shown, are substantially like those more fully shown and described in the patent to Curtis, No. 670,606, March 26, 1901, and comprise two co-operating series of axially alined cutting disks 27 (Figs. 7 and 9) the several disks of each series being separated by spacing disks 28, each cutting disk of one series being disposed opposite a spacing disk in the other series and substantially fitting between adjacent cutting disks of said other series so as to exert a shearing action on the metal, and one of the cutting edges of each disk being formed with notches or interruptions so as to leave the uncut portions or bonds between the ends of adjacent slits of the same longitudinal series. The two series of cutters 27 are arranged one above the other, each being carried by an arbor 30 journalled, as hereinafter more fully described, in uprights 31 and 32 supported by the standard 15. The pulley 19 is mounted on a shaft 33 journalled in the standard 15 and in a bracket 34 carried thereby, said shaft carrying a gear 35 meshing with a gear 36 rotatively mounted on a stud shaft 37 (Fig. 1) carried by the standard 32. Also mounted on the stud shaft 37, and connected with the gear 36 for rotation therewith, is a gear 38 which meshes with a gear 39 on the lower cutter arbor 30. The gear 38 also meshes with a similar gear 40 rotatively mounted on a stud shaft 41 also projecting from the upright 32, said gear 40 meshing with a gear 43 on the upper cutter arbor 30 and similar to the gear 39. By these connections it will be seen that the upper and lower cutter arbors 30 and the cutters 27 carried thereby are driven in unison and in opposite directions.

Each of the cutter arbors 30 is formed in two alined sections 30ª and 30ᵇ, respectively, each section 30ª being permanently journalled in the upright 32 and carrying a corresponding driving gear 38 or 43, and each section 30ᵇ is detachably secured to the section 30ª, the sections 30ᵇ carrying the cutting and spacing disks 27 and 28, and being journalled at their outer ends in the upright 31 which is removably secured to the standard 15, as will be hereinafter explained.

Each of the arbor sections 30ª is preferably formed at its inner end with a flange 44, and is provided, outside of its bearing in the upright 32 and between the upright and its driving gear 39 or 43, with a removable nut 45, whereby when said nuts are in place said arbor sections will be permanently retained in their bearings. As is usual in machines of this character, means are preferably provided whereby the axes of the two arbors may be adjusted toward and from each other, and as herein shown the section 30ª of the lower arbor is journalled in a fixed bearing block in the upright 32, while the bearing 46 for the section 30ª of the upper arbor is mounted for vertical movement in said upright, being adjusted therein by a vertical screw 47 journalled in the top of the upright and having threaded engagement with a lug 48 on said bearing block. The inner end of each arbor section 30ª is preferably formed with an axially disposed socket to receive the reduced adjacent end 49 of the corresponding arbor section 30ᵇ, thereby holding said arbor sections in alinement, said arbor section 30ᵇ being formed with a flange 50 lying adjacent the flange 44 and detachably secured thereto, as by cap screws 51. The cutting disks 27 and spacing disks 28 may be secured upon the arbor sections 30ᵇ in any usual or well known manner. As herein shown, each arbor section 30ᵇ is formed with a flange 52 against which the disks are clamped by a nut 53, said disks being angularly fixed with respect to the arbor by a feather or key 54. The plain, reduced outer ends of the arbor sections 30ᵇ are received in suitable bearings in the upright 31, the bearing for the lower arbor being fixed in said upright, and the bearing for the upper arbor comprising a bushing 55 mounted in a vertical slot 56 in said upright of sufficient length to permit a vertical adjustment of said bushing corresponding to the vertical adjustment of the bearing 46. The bushing 55 is secured in adjusted position in the slot 56 by means of a nut 57 in threaded engagement with the outer end of said bushing and between which and a flange 58 formed on the inner end of said bushing the upright 31 is clamped, the thrust of the cutters being taken up by an abutment screw 59 in threaded engagement with said upright.

The upright 31 is preferably formed on its lower side with a dovetailed rib 60 (Fig. 8) which is received in a correspondingly formed transverse groove in the upper face of the support or standard 15, thereby adapting said upright to be removed laterally from said standard when the screws 61, by which said upright is secured in place on said support or standard, are removed. The removable arbor sections 30ᵇ are attached to the arbor sections 30ª, mounted in the standard 32 and carrying the driving gears 38 and 40, by screws 51 passing through the flanges 50 and tapped in the flanges 44.

From the foregoing it will be understood that, by removing the attaching screws 61, the upright 31 will be released so that it may be slid laterally out of place (the ends of the arbor sections 30ᵇ being so formed as to permit said movement), whereupon the cutter disks 27 may be released from the arbors by unscrewing the nuts 53, or the arbor sections 30ᵇ, with their cutter disks, are adapted to be removed as a whole by removing the screws 51, all without disturbing the setting of the arbor sections 30ª, and without disturbing the driving gearing for the cutting mechanism, and also without disturbing the adjustment of the upper cutter-carrying arbor relative to the lower cutter-carrying arbor.

The feeding mechanism C comprises upper and lower feed rollers connected by gears 62 and 63 and mounted respectively on shafts 64 and 65, the latter of which is journalled in the table 18 and carries the pulley 21. The shaft 64 is carried by arms 66 pivoted at 67 to lugs 68 on the table 18 with which arms co-operate spring pressure devices 69, whereby the upper feed roll is forced toward the lower feed roll to clamp the metal between them.

The expanding mechanism B comprises laterally spaced upper and lower expander arms 70 and 71, the inner ends of which are supported substantially in the plane of the table 18 by uprights 72 rising from the platform 16, said inner ends of said arms being suitably secured to said uprights, as by bolts 73. The expander arms 70 and 71 are so arranged as to diverge from one another, as viewed in side elevation, being preferably oppositely inclined with respect to a horizontal plane, the arm 70 being upwardly inclined with respect to the table 18 and being supported at its upper or outer end from the platform 16 by an upright 74, and the arm 71 being downwardly inclined with respect to the plane of the table 18 and having at its lower or outer end a foot 75 resting upon and bolted to said platform 16.

Each of the arms 70 and 71 carries an inner longitudinally arranged series of parallel feed rolls 76 and an outer parallel series of co-operating feed rolls 77, the rolls 76 and 77 of the set carried by each arm being arranged to grip between them one edge of a slitted sheet, or the portion thereof at one side of its longitudinal median line, and feed the same longitudinally of the corresponding arm, the first pair of rolls on one arm being horizontally opposite the corresponding pair on the other arm, so as to receive the edges of the sheet as it comes from the feed rolls, and the divergence of the arms thereafter causing a transverse expansion of the sheet. The rolls 76 and 77 of the set carried by each arm are of progressively shorter length from the inner to the outer end of the arm, so that the two sets of rolls are caused to diverge from one another when viewed in plan, as shown in Fig. 5. By this arrangement the expansion of the sheet is caused to begin at its central portion and to progress transversely across the same toward the edges thereof, as will be clear to those skilled in the art.

The inner rolls 76 are rotatably mounted on fixed centers afforded by bolts or studs 78 carried by the expander arms and are retained thereon by nuts 79 applied to the ends of the said bolts or studs. The outer rolls 77 are yieldingly pressed toward the co-operating inner rolls 76, in order to grip the metal with a yielding pressure, and to this end are mounted on eccentric portions 80 (Fig. 3) of studs 81 rotatably mounted in the arms 70 and 71, said studs having at their outer ends radial arms 82 (see also Fig. 2) to which are attached links 83 having at their outer ends nuts 84 between which and flanges 85 at the inner edges of the arms 70 and 71 are interposed springs 86. The arms 82, links 83 and springs 86 constitute spring tension devices tending to turn the studs 81 and thereby move the rolls 77 toward the co-operating rolls 76. It will, of course, be understood that one of these spring tension devices is provided for each of the rolls 77 in both sets, but in order to avoid confusion only three of these devices are shown in Fig. 2, and they are omitted altogether from the other figures.

The inner ends of the bolts 78 of each set are connected and held in spaced relationship by means of a longitudinally extending strip or plate 87 disposed between the nuts 79 and suitably formed shoulders on said bolts, while the inner ends of the studs 81, which are formed concentric with the outer ends thereof, are similarly connected by a strip or plate 88 secured in position thereon by nuts 89, the inner faces of the plates or strips 87 and 88 being stepped or serrated to accommodate the ends of the respective rolls, as clearly shown in Fig. 5.

The pulley 20 is mounted on a shaft 90 journalled in a bracket 91 bolted to the platform 16, said shaft carrying a pinion 92 (Fig. 5) which meshes with a gear 93 on a shaft 94 journalled in uprights 950 bolted to the platform 16, and in the foot 75 of the lower expander arm 71. At its end adjacent the expander arm 71 the shaft 94 carries a gear 95 which meshes with a pinion 96 (see Fig. 4) formed on the outermost feed roll 77 of the corresponding set, said gear 95 also meshing with a similar gear 97 journalled on a stud carried by the arm 71 and meshing with a pinion 96 formed on the outermost feed roll 76 of the inner series. Each of the feed rolls 76 and 77 of each series is formed with a pinion portion 96, and disposed adjacent and parallel to each of said series of rolls is a series of power transmitting pinions 98 rotatably mounted on studs 99 carried by the corresponding expander arm, and each pinion 98 being disposed between and meshing with two adjacent pinions 96.

From the foregoing it will be seen that motion imparted by the gears 95 and 97 to the feed rolls 76 and 77 at the outer end of each series will be transmitted throughout each series of rolls to the inner end thereof by the pinions 96 and 98, all of the inner rolls being rotated at the same speed, and the rolls 76 and outer rolls 77 of each series being rotated in opposite directions.

Fast on the shaft 94 is a sprocket 100 connected by a chain 101 with a sprocket 102 on a shaft 103 journalled in the outer end of the upper expander arm 70 and carrying at its end a gear 104 (Fig. 6) which meshes with a gear 105 rotatably mounted on a stud 106 carried by said upper expander arm. The gears 104 and 105 are similar to and identical in function with the gears 97 and 95 respectively, and serve to transmit rotation to the rolls 76 and 77 of the upper set as will, it is thought, be obvious without further description in detail.

It will be seen that the power transmitted directly from the countershaft 26 to the pulley 20 is applied to the feed rolls directly at the outer end of each series and is transmitted therefrom throughout the series, rendering the transmission connections quite simple and readily accessible. Moreover it has been found that, by applying the power to the outer ends of the series of rolls, instead of to the inner ends thereof, as in machines of this general type as heretofore constructed, a smoother and more generally satisfactory drawing of the material through the machine is obtained and all difficulties caused by cramping or jamming of the gears and other parts are avoided. It will furthermore be seen that each series of rolls of the set on each arm is driven independently of the companion set on the same arm, and it is found that this arrangement affords a better adaptability of the mechanism to varying conditions and an easier self adjustment of the parts to backlash than where the driving connections for one series of rolls comprise gears connecting opposite rolls in the two series.

In addition to the simplification and increased accessibility afforded by the separate drives for the slitting, expanding, and feeding mechanisms, as above pointed out, it will be seen that, by the use of suitable clutches or belt shifters, any of these three mechanisms may be stopped independently of the others should circumstances so require.

Having thus described my invention I claim and desire to secure by Letters Patent:

1. In a metal lath machine, the combination with a pair of cutter-carrying arbors each formed in two parts detachably secured together, of two standards in which said arbors are journalled, a support on which one of said standards is detachably mounted, gears fixed to permanently mounted parts of said arbors, outside of the other of said standards, and means for removably attaching the cutters to said arbors; whereby, when said detachable standard is dismounted the said cutters may be removed from the machine without disturbing said arbors, and whereby also the detachable parts of said arbors may be removed from the machine without disturbing the permanently mounted parts of said arbors and the gears carried thereby.

2. In a metal lath machine, the combination with a pair of cutter-carrying arbors each formed in two parts detachably secured together, one of said arbors being adjustably mounted relative to the other, of two standards in which said arbors are journalled, a support on which one of said standards is detachably mounted, gears fixed to permanently mounted parts of said arbors outside of the other of said standards, means for removably attaching the cutters to said arbors, and means for adjusting one of said arbors relative to the other; whereby, when said detachable standard is dismounted the said cutters may be removed from the machine without disturbing said arbors, and whereby also the detachable parts of said arbors may be removed from the machine without disturbing the permanently mounted parts of said arbors and the gears carried thereby and also without disturbing the relative adjustment of said arbors.

3. In a machine of the character described, in combination, a pair of cutter arbors, means for driving the same, a fixed support in which one end of each of said arbors is journalled, a movable support for the opposite ends of said arbors, cutters carried by said arbors and longitudinally removable therefrom, and means whereby said arbors may be adjusted toward and from one another, said means including a bushing adjustably mounted in said movable support and receiving the adjacent end of one of said arbors, said arbor and bushing being separable in a direction longitudinal of said arbor, and an abutment screw co-operating with said bushing.

4. In a machine of the character described, in combination, a pair of cutter arbors each comprising two longitudinally alined sections, means for detachably connecting said sections together, a fixed support in which one of the sections of each of said arbors is permanently journalled, driving gears carried by the last-named sections of said arbors outside of said support, a removable support in which the other sections of said arbors are journalled, and cutters carried by the last-named parts of said arbors between said supports.

5. In a machine of the character described, in combination, a pair of cutter-carrying arbors each comprising two longitudinally alined sections, one pair of said sections having sockets to receive the adjacent ends of the other pair of sections, the adjacent ends of the said sections being provided with flanges, screws for detachably connecting said flanges, a support in which one pair of said sections is permanently journalled, gears carried by said last-named sections outside of said support, cutting means carried by the other pair of said sections, and a removable support in which the removable parts of said arbors is journalled.

6. In an expanded metal machine, in combination, cutting mechanism, feeding mechanism, a source of power, independent driving connections between said source of power and said cutting and feeding mechanisms respectively, expanding mechanism comprising a pair of outwardly diverging expanding arms provided respectively with means for engaging a slitted sheet at opposite sides and feeding the same longitudinally of said arms, and separate driving connections from said source of power to said engaging and feeding means at the outer ends of said expanding arms.

7. In an expanding mechanism for expanded metal machines, two parallel series of co-operating but disconnected feed expanding rollers, means for applying power to the outermost one of the rollers of each series to drive the same, and transmission devices connecting the several rollers of each series whereby they are driven in unison.

8. In an expanded metal machine, expanding mechanism comprising, in combination, a pair of outwardly diverging sets of rollers, each set comprising two parallel series of co-operating but disconnected rollers, means for applying power to the outermost of the rollers of the several series, and transmission devices connecting the several rollers of each series whereby they are driven in unison.

9. In an expanding mechanism for expanded metal machines, two parallel series of co-operating feed rollers, fixed studs upon which the rollers of one of said series are rotatably mounted, rotatable studs having eccentric portions upon which the rollers of the other of said series are rotatably mounted, spring tension devices for rotating said last-named studs to force said last-named rollers toward the rollers of said first-named series, and means for driving all of said rollers in unison.

In testimony whereof I affix my signature.

WILLIAM C. WEIGHTMAN.